US008296307B2

(12) United States Patent
Gao et al.

(10) Patent No.: US 8,296,307 B2
(45) Date of Patent: Oct. 23, 2012

(54) CONTACT INFORMATION QUERYING

(75) Inventors: Bo Gao, Beijing (CN); Chang Jie Guo, Beijing (CN); Tie Jun Ou, Beijing (CN); Wei Sun, Beijing (CN); Zhi Hu Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 12/549,019

(22) Filed: Aug. 27, 2009

(65) Prior Publication Data
US 2010/0057730 A1 Mar. 4, 2010

(30) Foreign Application Priority Data

Aug. 29, 2008 (CN) .......................... 2008 1 0212688

(51) Int. Cl.
*G06F 7/00* (2006.01)
*G06F 17/30* (2006.01)
(52) U.S. Cl. ........................................................ 707/755
(58) Field of Classification Search .................. 707/708, 707/736, 999.003, 755
See application file for complete search history.

(56) References Cited

U.S. PATENT DOCUMENTS

| 2005/0216444 | A1* | 9/2005 | Ritter et al. ........................ 707/3 |
| 2006/0190422 | A1* | 8/2006 | Beale et al. ........................ 707/1 |
| 2009/0031232 | A1* | 1/2009 | Brezina et al. ................ 715/764 |

\* cited by examiner

*Primary Examiner* — Van Oberly
(74) *Attorney, Agent, or Firm* — Gail H. Zarick; Anne Vachon Dougherty (57) ABSTRACT

System and method for querying of contact information are disclosed. An aspect of the invention includes a method for querying contact information. The method includes receiving a query language including relationship information of a plurality of contacts with unknown contact information. The method further includes acquiring a query request, wherein acquiring the query request includes parsing the query language according to a query language syntax. The method further includes querying contact information of the plurality of contacts with unknown contact information in at least one directory to obtain the contact information of the plurality of contacts with unknown contact information requested in the query request. The method further includes returning the contact information of the plurality of contacts with unknown contact information requested in the query request.

20 Claims, 6 Drawing Sheets

CONTACT INFORMATION QUERYING

CROSS-REFERENCE TO RELATED APPLICATIONS

This application claims priority under 35 U.S.C. §119 to Chinese Patent Application No. 200810212688.4 filed Aug. 29, 2008, the entire contents of which is incorporated herein by reference.

BACKGROUND

1. Field of the Invention

The present invention generally relates to the field of data processing. More particularly, the present invention relates to a system and a method for querying contact information.

2. Description of Related Art

Means of communication between people have become more abundant with the development of communication technology. Traditional voice telephones, video telephones, cell phones, network phones, email services, instant messages, short message services and others are among the various existing communication means which use different communication tools which involve different contact information. For example, when an email communication means is used an email transceiver application and an email address are required and when a cell phone is used cell phone numbers are required as contact information.

People will encounter various contacts as communication means become increasingly abundant. This phenomenon is apparent in large-scale multinational corporations. In a global enterprise, the actual geographical location of staff may no longer be important, whereas staff members might not know where a colleague is located but know how to contact each other. For example, enterprise staffs communicate internally and externally via means of email service, instant messaging applications, telephone services, fax services, and various carrier services.

Contacts of a company's staff member can include colleagues, classmates, friends, relatives, clients and other types of contacts. There may also be repetition among contacts of these types. For example, staff member Alice may be both a classmate and a colleague of staff member Bob. Additionally, information on these contacts is typically not kept unchanged but rather varying. For example, an email address, a cell phone number, or traditional telephone number may change. When a user attempts to contact a desired contact according to a maintained address list, the existing contact information may be obsolete.

Responsibilities of staff members in large-scale multinational environments change dynamically over time. For example, a user might not know the email address of each staff member or relationships among staff members because the company's organization structure may have changed. Therefore, a common practice is to query contact information in the latest enterprise address list other than in the address list maintained by each individual staff member, thereby guaranteeing the acquisition of updated contact information.

Figure 1:
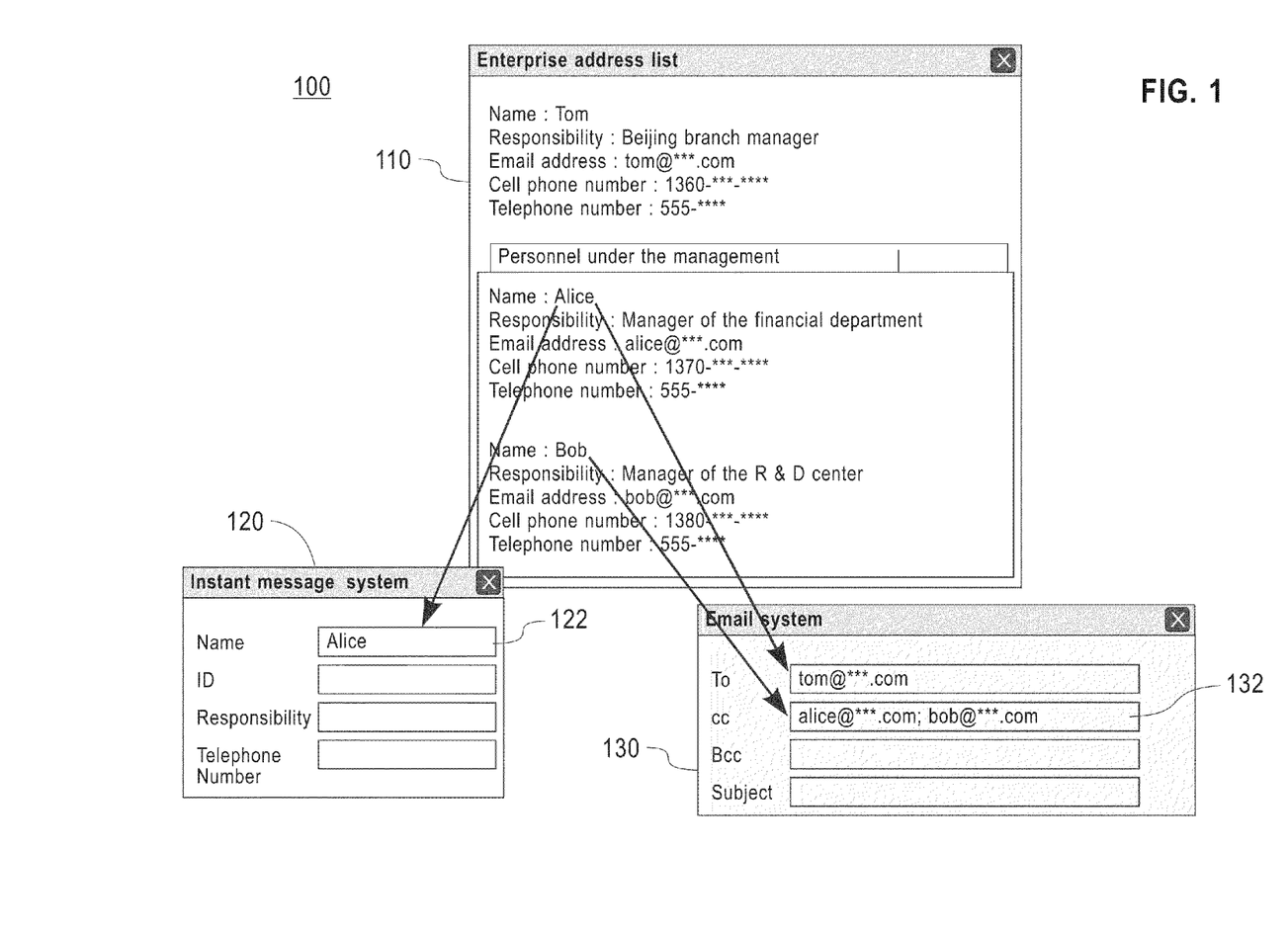
FIG. 1 illustrates a method for looking up contact information of unknown contacts.

Email systems and address list tools are typically independent one of each another. Therefore, users may query contact information on an unknown contact(s) from different tools, as shown in FIG. 1. For example, an email system and an instant messaging system are usually employed in an enterprise, and an enterprise address list is used as a contact information memory system. Referring to FIG. 1, a method 100 is shown for acquiring contact information.

FIG. 1 illustrates a method for looking up contact information of unknown contacts. A schematic enterprise address list interface 110 is illustrated in FIG. 1. For example, when a user wants to carbon copy ("CC") an email to personnel under the management of Tom through an email system 130 and wants to add information on personnel under the management of Tom to the field of new contacts of an instant messaging system 120, he/she can perform the following operations: open the interface of the enterprise address list and find Tom's personal information; find names of personnel (e.g. Alice and Bob) under the management of Tom from "personnel under the management" and find corresponding email addresses; and manually enter email addresses of these persons to a "CC" field 132 of the email system 130 through copy/paste operation and enter the information to a new contact field 122 of the instant messaging application 120. Lookup and copy/paste of email addresses is a time-consuming task when a user needs to send an email to each of multiple contacts. For example, sending an email to each of all employees of a "manager" in an enterprise would be a complex task.

Sending an email to a particular contact A with an unknown email address and "CC" this email to unknown contacts B and C having a particular relationship with the contact A is quite common. For example, contact B is the manager of A, and contact C is the assistant of the manager of A.

SUMMARY OF THE INVENTION

System and method for querying of contact information are disclosed. An aspect of the invention includes a method for querying contact information. The method includes receiving a query language including relationship information of a plurality of contacts with unknown contact information. The method further includes acquiring a query request, wherein acquiring the query request includes parsing the query language according to a query language syntax. The method further includes querying contact information of the plurality of contacts with unknown contact information in at least one directory to obtain the contact information of the plurality of contacts with unknown contact information requested in the query request. The method further includes returning the contact information of the plurality of contacts with unknown contact information requested in the query request.

Another aspect of the invention includes a system for querying contact information, The system includes a means for receiving a query language including relationship information of a plurality of contacts with unknown contact information. The system further includes a means for acquiring a query request, wherein acquiring the query request includes parsing the query language according to a query language syntax. The system further includes a means for querying contact information of the plurality of contacts with unknown contact information in at least one directory to obtain the contact information of the plurality of contacts with unknown contact information requested in the query request. The system further includes a means for returning the contact information of the plurality of contacts with unknown contact information requested in the query request.

Another aspect of the invention includes a computer program product for querying contact information, the computer program product including a computer readable storage medium to store a computer readable program. The computer readable program when executed on a computer causes the computer to carry out the steps of the above method.

These and other features, aspects, and advantages of the present invention are better understood when the following Detailed Description is read with reference to the accompanying drawings.

DETAILED DESCRIPTION OF THE PREFERRED EMBODIMENTS

Embodiments of the disclosure relate generally to the field of data processing. For example, embodiments of the disclosure relate to systems and methods for contact information querying. Throughout the description, for the purposes of explanation, numerous specific details are set forth in order to provide a thorough understanding of the present disclosure. It will be apparent, however, to one skilled in the art that the present disclosure can be practiced without some of these specific details. In other instances, well-known structures and devices are shown in block diagram form to avoid obscuring the underlying principles of the present disclosure.

Figure 2:
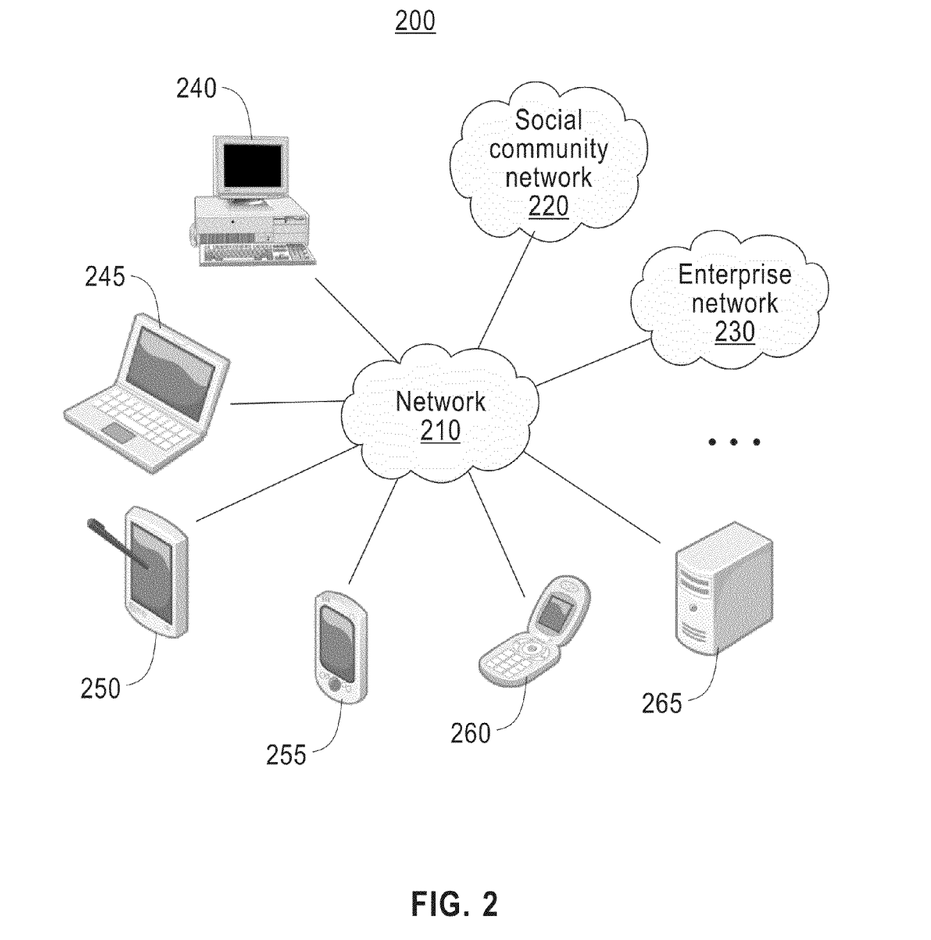
FIG. 2 illustrates a network architecture for querying contact information, according to one embodiment.

FIG. 2 illustrates a schematic view of a network architecture 200 in which the present invention can be implemented. The network architecture 200 can include: a personal computer 240, a laptop 245, a panel computer 250, a personal digital assistant (PDA) 255, a cell phone 260, a server 265, and other devices. The network architecture 200 can further include a computer network 210, and the computer network 210 can be connected to one or more enterprise networks 220 and social network communities 230. Network 210 is a medium which is used for providing communication links between devices 240-265. Networks 210, 220 and 230 can include different connection types, such as wired, wireless communication links, optical fiber cables, and the like.

FIG. 2 illustrates network architecture for querying contact information, according to one embodiment. Server 265 can be a server on which applications according to embodiments of the present invention are mounted. Terminal devices can include a personal computer 240, laptop 245, a panel computer 250, a personal digital assistant (PDA) 255, and a cell phone 260 according to embodiments of the present invention. Different relationship information and contact information can be stored in social community network 220 and an enterprise network 230 shown according to one embodiment. Users can access such relationship information and contact information through suitable plugins, which will be described in detail below. The types and number of the terminal devices and the servers are illustrative and any suitable type and number of terminal devices and servers can be used as needed.

Explanations for terms which are frequently used in the present invention are herein provided. A directory can include a particular storage mode for all information between respective contacts within a group. Table 1 shows the composition of an illustrative enterprise directory. Directory information can include the sum of information stored in a directory which can include a directory name, a directory description, a directory connection, different relationship information, and contact information for contacts, as illustrated in Table 1. Relationship information can include relevance information on contacts within a directory. For example, there are contacts A, B and C, among whom A and B are in a relationship that B is A's manager; and B and C are in a relationship that C is B's assistant; and A and C are not in a direct relationship as illustrated in the Manager relationship and Assistant relationship between contacts in Table 1. Contact information on contacts can include personal information corresponding to a plurality of particular contacts including an email address(es), a telephone number(s), a cell phone number(s), instant messaging ID(s), and other information. Unknown contacts can include a user who does not know any information, such as a name of an unknown contact, except for the relationship between the unknown contact and a particular known contact.

TABLE 1

| Example of Enterprise Directory | | |
|---|---|---|
| Directory Name | Enterprise Directory | |
| Directory Description | Simplified Example of Enterprise Directory | |
| Directory Connection | Address | Enterprise Directory Access Address |
| | Account ID | Alan |
| | Account Password | **** |
| Relationship | Manager | |
| | Branch Manager | |
| | Assistant | |
| | etc | |
| contactType | emailAddress | |
| | telephoneNumber | |
| | celphoneNumber | |
| | IM_ID | |
| | etc | |

Figure 3:
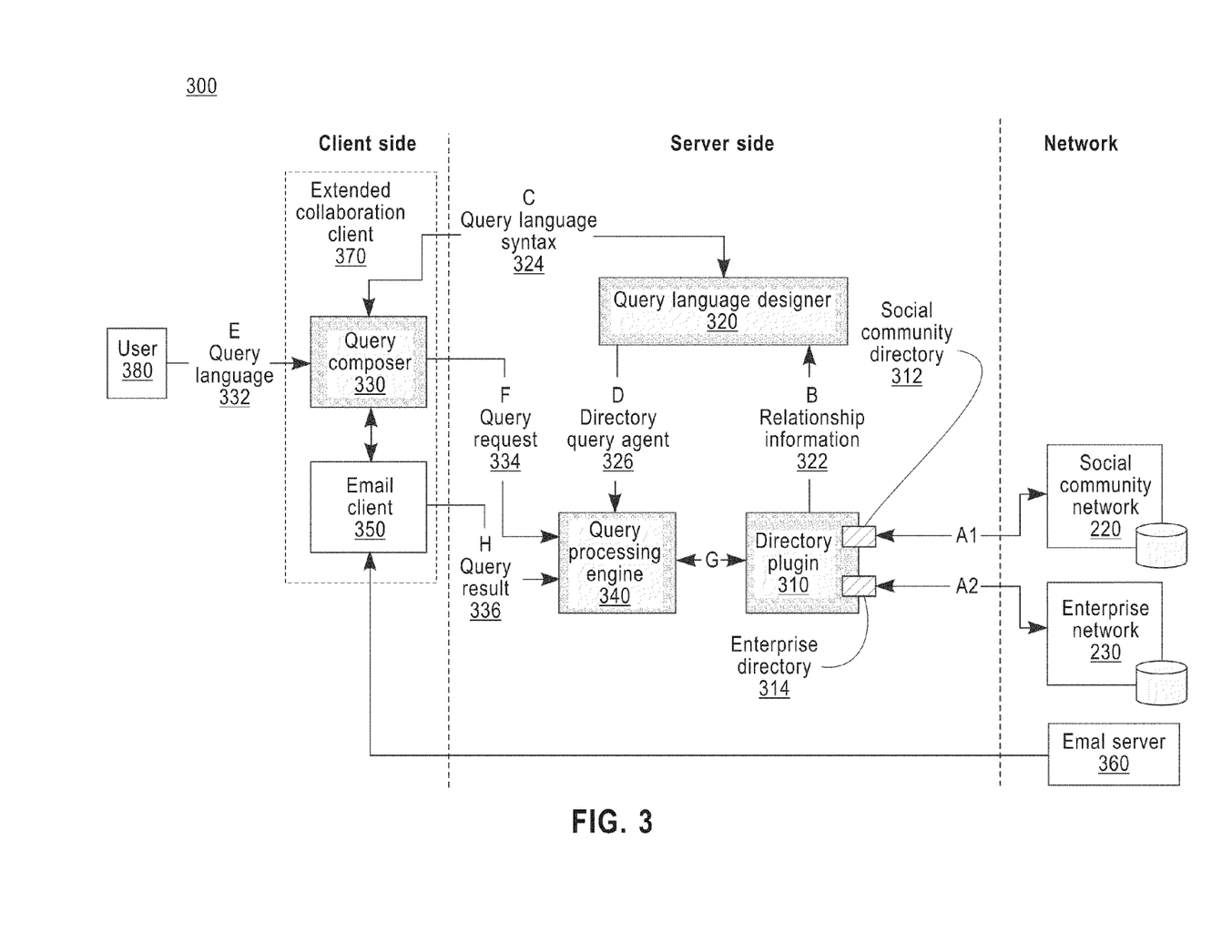
FIG. 3 illustrates a system for querying of contact information of a plurality of unknown contacts, according to one embodiment.

FIG. 3 illustrates a system for querying of contact information of a plurality of unknown contacts, according to one embodiment. System 300 includes a directory plugin 310, a query language designer 320, a query composer 330, a query processing engine 340, an email client 350, an email server 360, a social community network 220, and an enterprise network 230. In FIG. 3 modules shown in shadow are modules specially designed and implemented for carrying out the method for querying contact information. The query composer 330 is an extended application of email client 350, which operates as an interface for a user 380 in the system to input a query language 332 and which forms a part of an extended collaboration client 370 in conjunction with email client 350, just as shown in a dashed-line block in FIG. 3. In query system 300 shown in FIG. 3, a main operation flow is divided into two phases, an initialization phase and a query phase.

During the initialization phase, directory plugin 310 extracts data from different networks, including a social community network 220, an enterprise network 230 and the like, as illustrated by arrows A1 and A2. Data relationship information and contact information is parsed to compose one or more directories, such as a social community directory 312 and an enterprise directory 314. Directory plugin 310 sends parsed relationship information 322 to query language designer 320, as illustrated by arrow B. Relationship information 322 may correspond to one or more directories. Subsequently, query language designer 320 parses relationship information 322 from directory plugin 310, generates corresponding query language syntax 324, and sends the query language syntax 324 to query composer 330, as illustrated by arrow C. Additionally, query language designer 320 generates a directory query agent 326, which corresponds to relationship information 322, and sends the directory query agent 326 to query processing engine 340, as illustrated by arrow D.

The query phase starts after the completion of the initialization of the directory by the plugin 310, the query language designer 320, and the query processing engine 340. User 380 inputs the query language 332 into the query composer 330 at the extended collaboration client 370, as illustrated by arrow E. The query language 332 is a query language composed according to query language syntax transferred by query language designer 320. The query composer 330 parses the query language 332 inputted by the user 380 and sends a query request 334 to the query processing engine 340, as illustrated by arrow F. The query processing engine 340 parses content of the query request 334 and invokes the content query agent 326 so as to perform a query in the directory plugin 310 for acquiring a query result, as illustrated by arrow G. The query processing engine 340 returns a query result 336 to the email client 350, as illustrated by arrow H. The user 380 can communicate with unknown contacts using the email client 350 via the email server 360, as illustrated by arrow I.

Figure 4:
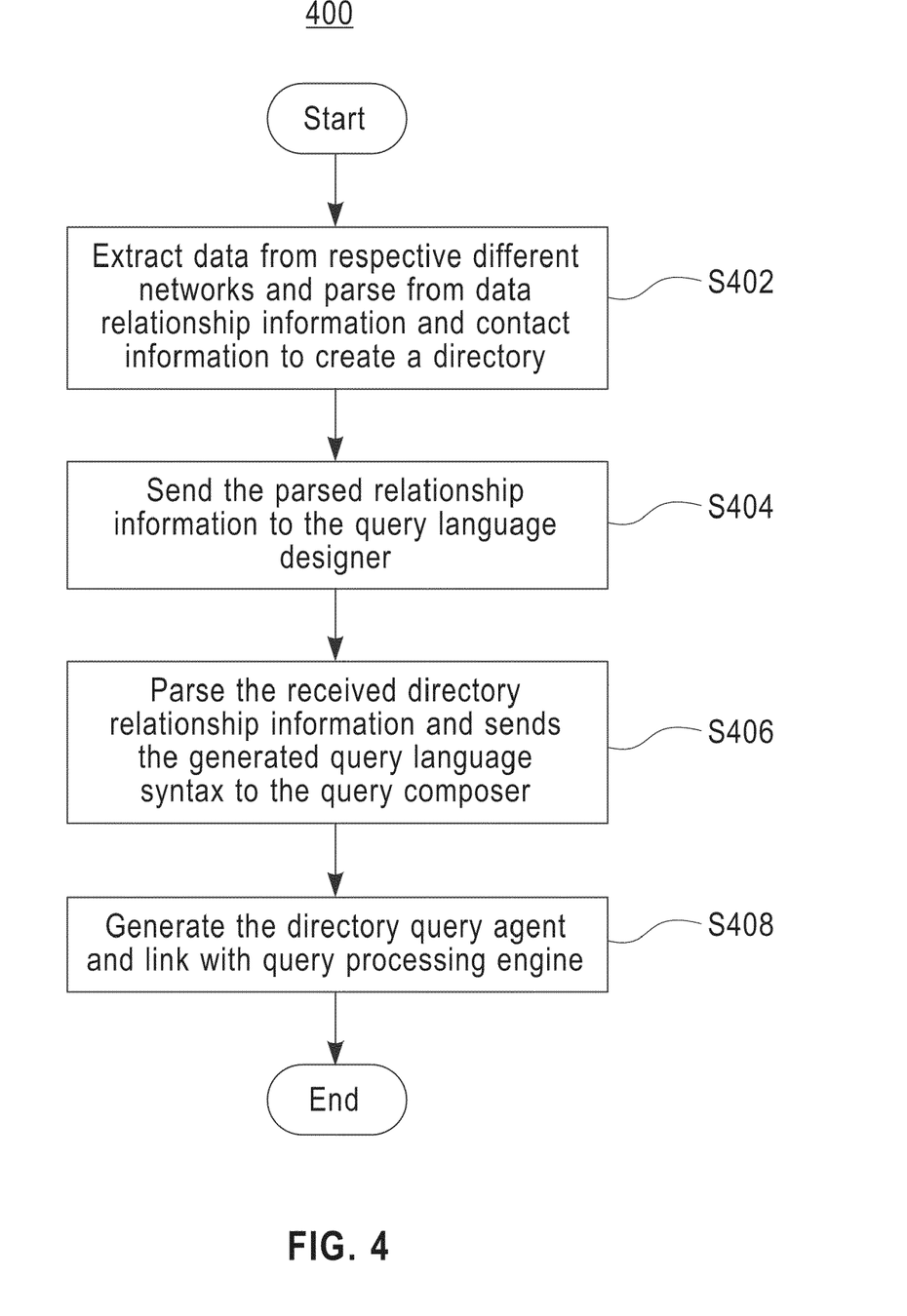
FIG. 4 illustrates a flow diagram of a method for initializing a query system, according to one embodiment.

FIG. 4 illustrates a flow diagram of a method for initializing a query system, according to one embodiment. In step S402, directory plugin 310 extracts data from a plurality of respective networks, including the social community network 220, the enterprise network 230 and the like, and parses from the data relationship information 322 and contact information so as to compose one or more directories. Relationship information and contact information, which come from the same network, is saved under the same directory. In step S404, the directory plugin 310 sends the parsed relationship information 322 to query language designer 320. In step S406, the query language designer 320 parses the relationship information 322 from the directory plugin 310 and sends the corresponding query language syntax 324 being generated to the query composer 330. In step S408, the directory query agent 326 is generated and linked with the query processing engine 340. Steps S406 and S408 are performed in an order, which is not limited to the order shown in FIG. 4, and can be performed in parallel or even in order of temporal non-precedence.

The directory plugin 310 is a means for defining a directory. For example, the user can be associated with the social community network 220 and even with the enterprise network 230. The user can be associated with other social relationships besides the social community network 220 and the enterprise network 230. For example, when the user is a staff member with a large-scale global enterprise, the directory under which he/she is located can have the following relationship information: a general manager, a branch manager, a R&D center manager, an assistant, etc. For another example, when the user is a civil servant with a state organization, the directory under which he/she is located can have the following relationship information: a general director, a division director, a section chief, and a group leader, etc.

In social community network 220 or enterprise network 230 there is usually stored a plurality of relationship information between a contact and the social community or correspondences between a contact with other contacts, such as an address list of the social community or an internal address list of the enterprise.

An email system within the enterprise network 230 is illustrated according to one embodiment. The design of a directory can include the following content: a directory name, a directory ID, a directory description, a directory connection (including, e.g. address, account ID, account password, etc.), a directory query agent, and the like. The directory query agent 326 can include the following content: (1) public static variable, including: relationship information (e.g. manager, branch manager, assistant, etc.); contact information type (e.g. emailAddress, telephoneNumber, IM_ID (instant message ID), etc.); input type: emailAddress, IM_ID; (2) function, including: getContactbyRelationship (relationship, contactType, inputTupe, input[ ]); (3) dependency code library: (e.g. jar files).

Table 2 illustrates an enterprise directory arrived at by extracting data from the enterprise network 230 and parsing from data relationship information and contact information on a contact. The directory can include information as shown in Table 2.

TABLE 2

Enterprise Directory

| | | |
|---|---|---|
| Directory Name | Enterprise Directory | |
| Directory ID | bp | |
| Directory Description | Simplified Example of Enterprise Directory | |
| Directory Connection | Address | Access Address of Enterprise Directory |
| | Account ID | Alan |
| | Account Password | **** |
| Directory Query Agent | Public Static Variable | Relationship Manager, BranchManager, Assistant, etc. |
| | | conactType emailAddress, telephoneNumber, cellphoneNumber, IM_ID (instant message ID), etc. |
| | | inputType emailAddress, IM_ID, etc. |
| | Function | getContactbyRelationship (relationship, contactType, inputTupe, input[ ]) |
| | Dependency Code Library | jar files |

Table 3 illustrates directory information being extracted in the context of a social community directory, according to one embodiment

TABLE 3

Social Community Directory

| | | |
|---|---|---|
| Directory Name | Social Community Directory | |
| Directory ID | fb | |
| Directory Description | Simplified Example of Social Community Directory | |
| Directory Connection | Address | Access Address of Social Community Directory |
| | Account ID | Alan |
| | Account Password | **** |
| Directory Query Agent | Public Static Variable | Relationship Classmate, Relative, Friend, etc. |
| | | conactType emailAddress, telephoneNumber, cellphoneNumber, IM_ID (instant message ID), etc. |
| | | inputType emailAddress, IM_ID, etc. |
| | Function | getContactbyRelationship (relationship, contactType, inputTupe, input[ ]) |
| | Dependency Code Library | jar files |

The user can design the directory in the directory plugin 310 according to information provided by a plurality of different social community networks 220 and enterprise networks 230. The directory plugin 310 can further include one or more directories at the same time. The plurality of directories as shown in Table 1 in directory plugin 310, employs a different directory ID and has respective content for each directory. In step S402 of FIG. 4, the social community directory 312 (e.g. with a directory ID of fb) and enterprise directory 314 (e.g. with a directory ID of bp) are composed in directory plugin 310 by acquiring corresponding directory information from the social community network 220 and the enterprise network 230.

The directory plugin 310 sends the relationship information 322 to the query language designer 320 so as to parse the query language syntax 324 and compose the directory query agent 326 after the related directories 312 and 314 are generated in the directory plugin 310 from the social community network 220 and the enterprise network 230.

The functions of the query language designer 320 are to provide query language syntax for a query method based on relationship information and provide available directory query agent 326 for query processing engine 340. The following information needs to be identified and defined in the query language designer 320: a plugin ID, an input type, a contact information type, a relationship information, and function name. Further, a complex logic query which supports logic operations including AND, OR, NOT and the like can be defined. There can be one or more functions as defined in Tables 4, 5, 6, and 7 in the query language designer 320.

TABLE 4

Function of Directory bp: Manager

| | |
|---|---|
| Plugin | bp |
| Input Type | EmailAddress |
| Contact Information Type | EmailAddress |
| Relationship | Manager |
| Function Name | Manager |
| Complex Logic Query | AND, OR, NOT, etc. |

TABLE 5

Function of Directory bp: BranchManager

| | |
|---|---|
| Plugin | bp |
| Input Type | EmailAddress |
| Contact Information Type | EmailAddress |
| Relationship | BranchManager |
| Function Name | BranchManager |
| Complex Logic Query | AND, OR, NOT, etc. |

TABLE 6

Function of Directory bp: Assistant

| | |
|---|---|
| Plugin | bp |
| Input Type | EmailAddress |
| Contact Information Type | EmailAddress |
| Relationship | Assistant |
| Function Name | Assistant |
| Complex Logic Query | AND, OR, NOT, etc. |

TABLE 7

Function of Directory bp: Friend

| | |
|---|---|
| Plugin | bp |
| Input Type | EmailAddress |
| Contact Information Type | EmailAddress |
| Relationship | Friend |

TABLE 7-continued

Function of Directory bp: Friend

| | |
|---|---|
| Function Name | Friend |
| Complex Logic Query | AND, OR, NOT, etc. |

The query language including the functions shown in Tables 4, 5, 6, and 7 can be expressed using a markup language as follows:

```
<Query Language>
   <Function>
      <FunctionName>Manager</FunctionName>
      <InputType>emailAddress</InputType>
      <DirectoryPluginID>bp</DirectoryPluginID>
      <RelationshipType>Manager</RelationshipType>
      ...
   </Function>
   <Function>
      <FunctionName>BranckManager</FunctionName>
      <InputType>emailAddress</InputType>
      <DirectoryPluginID>bp</DirectoryPluginID>
      <RelationshipType> BranckManager </RelationshipType>
      ...
   </Function>
   <Function>
      <FunctionName>Asistant</FunctionName>
      <InputType>emailAddress</InputType>
      <DirectoryPluginID>bp</DirectoryPluginID>
      <RelationshipType> Asistant </RelationshipType>
      ...
   </Function>
   <Function>
      <FunctionName>Friend</FunctionName>
      <InputType>emailAddress</InputType>
      <DirectoryPluginID>fb</DirectoryPluginID>
      <RelationshipType>Friend</RelationshipType>
      ...
   </Function>
   <Function>...</Function>
</Query Language>
```

After the query language designer 320 parses the query language syntax 324, the query language designer 320 sends query language syntax 324 to the query composer 330, illustrated in step S406 of FIG. 4. The query language designer 320 generates the directory query agent 326 and deploys the directory query agent 326 to the query processing engine 340, as illustrated in step S408 of FIG. 4.

It is to be understood that the initialization steps as shown in FIG. 4 can be repeated. The "initialization steps" involved here refer to the procedure of extracting and parsing data contained in social community network 220, enterprise network 230 or other network, which might be used during the query procedure, as well as the steps of initializing directory plugin 310, query language designer 320, query processing engine 330, and query composer 340 using the parsed relationship information 322 and contact information. Further, the "initialization steps" are not necessarily carried out during the initialization phase but can be carried out during any phase of the operation of the query system. For example, when the user wants to query a new directory relationship which is not contained in the existing system, then a new round of "initialization" of the query system needs to be carried out using data in a target network containing this new directory.

Figure 5:
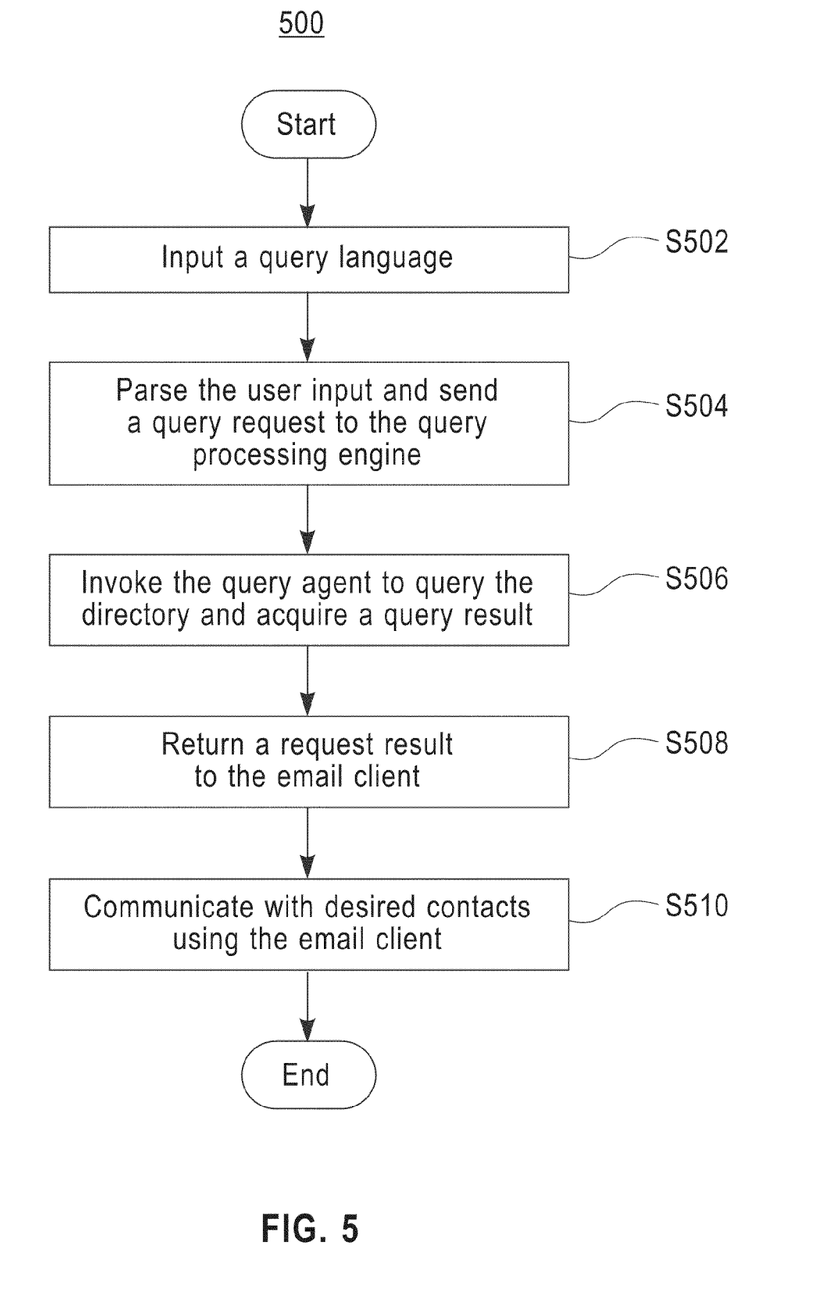
FIG. 5 illustrates a flow diagram of a method for querying contact information of a plurality of unknown contacts, according to one embodiment.

FIG. 5 illustrates a flow diagram of a method for querying contact information of a plurality of unknown contacts, according to one embodiment. The procedure of initializing the directory plugin 310, the query language designer 320, the query processing engine 330, and the query composer 340 is completed before the query phase. In step S502, user 380 inputs the query language 332 into the query composer 330 according to the defined query language syntax 324. In step S504, the query composer 330 parses the input query language 332 and sends the query request 334 to the query processing engine 340. The contact information on contacts from the social community network 220, the enterprise network 230 or the other network(s) is only stored in the directory plugin 310, so the query processing engine 340 needs to invoke the directory query agent 326 to the query directory plugin 310 for acquiring contact information on a desired contact in step S506. In step S508, the query processing engine 340 returns the query result 336 to the email client 350. In step S510, the user 380 can communicate with the email server 360 using the returned query result 336 (i.e. the returned email addresses of unknown contacts) via the email client 350 and further send an email to each of unknown contacts.

The functions of the query composer 330 are to the process query language 332 input by the user 380 so as to generate the query request 334. According to the query language syntax 324, the user 380 inputs the query language 332 which includes the following information: a directory ID, a function ID, and a plurality of reserved input variables. The directory ID represents the directory under which data to be operated by the user 380 belongs, (i.e. the directory under which relationship information to be selected by the user belongs). The function ID represents which function under a selected directory the user desires to execute for operation. The reserved input variables vary with the input type, as illustrated in Table 8.

TABLE 8

Reserved Input Variables for Different Input Types

| Input Type | Reserved Input Variables |
| --- | --- |
| emailAddress | To[ ] |
| | CC[ ] |
| | BCC[ ] |
| cellphoneNumber | Cell Phone Number |
| telephoneNumber | Telephone Number |
| IM_ID | Instant Message ID |
| ... | ... |

In Table 8, three reserved words, "To," "CC" and "BCC," are given for the email client. In email systems there are usually three modes of setting target contacts who can receive an email. In an email system, entered into the "To" field is the email address of a direct recipient. When the user enters the email address of a target contact to the field "To," the email will be directly sent to the target contact. Entered into the field "CC (Carbon Copy)" is the email address of a copy-recipient; that is, when the user enters the address of contact A to the "To" field and enters the address of contact B to the field "CC", the system will "CC" the email to contact B while directly sending the email to contact A. At this point, information on the sender's address and the recipient's (contact A) address can be seen in the header of the email received by contact B. Furthermore, the mode "BCC (Blind Carbon Copy)" is implemented similarly to the mode "CC." The difference is that the "CC" recipient is undisclosed in the mode "BCC."

Although three reserved input variables are shown for the input type emailAddress in Table 8, a situation where reserved input words are omitted also exists. For example, for a query language included in the content shown in Table 4, query function "Manager" can be described using the following markup language:

```
<Query>
    <DirectoryID>bp</DirectoryID>
    <FunctionName>Manager</FunctionName>
    <Input>To</Input>
    ...
</Query>
```

The syntax structure of the query language directly used by the user 380 herein is a query language based on relationship information, in which the user 380 first selects the directory under which a contact is located, defines desired relationship information by specifying a query function and inputting variables, and further acquires information on unknown contacts, according to one embodiment.

A concrete implementation of the query language in the context of email communication means for the email client system includes three kinds of reserved words, namely "To [ ]," "CC[ ]," and "BCC[ ]." In the reserved variables, a positive integer "n" can be input into square parentheses "[ ]" or square parentheses "[ ]" are kept blank. This positive integer "n" represents to which contact in the email client system a current reserved variable refers. For example, "To[1]" refers to the first contact in the "To" field of the email client system, and "CC[4]" refers to the fourth contact in the "CC" field of the email client system. If square parentheses "[ ]" are left blank, then this reserved variable refers to all contacts in the reserved words field. For example, "To[ ]" refers to all contacts in the field "To."

For example, respective directory information existing in an enterprise directory (with a directory ID of bp) and a social community directory (with a directory ID of fb) is illustrated in Table 2 and Table 3. For bp, there are three relationships, namely Manager, BranchManager and Assistant. As shown in Tables 4, 5 and 6, functions corresponding to these three relationships are a function Manager, a function BranchManager and a function Assistant, respectively. The reserved input variables corresponding to the input type of emailAddress are found to be "To[ ]," "CC[ ]" and "BCC[ ]," as illustrated in Table 8.

The query language is composed according to the foregoing information. Suppose before the inventive method is applied, the email address of "Alan" has been input into the field "To." "Alan" is hence the first contact in the field "To," i.e. "To[1]." The user can implement a desired complex query by combining methods described in these four examples and applies a query result to the field "CC," "BCC" and the like. The following four examples illustrate a method for composing the query language in four simple situations:

EXAMPLE 1 query the email address of the assistant of the manager of the first contact (namely Alan) in the "To" field in the enterprise directory;
bp.Assistant (Manager (To[1])

EXAMPLE 2 query the email addresses of the managers of all contacts in the "To" field in the enterprise directory;
bp.Manager (To)

EXAMPLE 3 query the email addresses of all "Manager" in the enterprise directory, i.e. query the email addresses of all managers in the directory;

bp.Manager( )

It should be noted that in this query, if there is no input variable in parentheses following the function, this means querying the email addresses of all "Manager" in the bp directory.

EXAMPLE 4 in the enterprise directory bp and the social community directory fb, get the email addresses of all contacts who meet the following requirements: the desired contacts are not only the managers of the first contact (namely Alan) in the "To" field in the enterprise directory but also the friends of the second contact in the "CC" field in the social community directory fb.

bp.Manager (To[1]) AND fb.Friend (CC[2])

In Example 4, suppose bp.Manager (To[1]) returns the email addresses of three contacts and fb.Friend (CC [2]) returns the email addresses of 10 contacts. Through logic "AND" operation, the final result returns the email addresses in the intersection of the set of the email addresses of three managers and the set of the email addresses of 10 friends. During communication via email, logic operations "AND," "OR" and "NOT" and the usage of reserved input variables "To[ ]," "CC[ ]" and "BCC[ ]" are similar to the foregoing examples.

The user can hardly memorize all related content under one or more directories which have been composed or are to be composed in future because the user might desire to send an email to each of contacts under different directories, and function information used during invocation and relationship information under different directories varies (as shown in Table 2). Therefore, there is a need to provide a query language prompting means which facilitates user input.

The query composer 330 can prompt the user of how to input a query request which conforms to the query specification, by displaying a help file of query language syntax 324 or directly popping up in the proximity of the user input location options which prompt rules of query language syntax 324 when the user inputs a query language into the query composer 330.

The help file of the query syntax rules can be displayed in a separate document window or directly displayed in the user interface of query composer 330. In the case where the prompt options are displayed directly, after the user inputs a certain directory identification, function information contained under the directory corresponding to this directory identification is directly displayed at the next input location. For example, the example of the directory bp as shown in Table 2 contains three relationships, namely Manager, BranchManager and Assistant. Furthermore, these three relationships Manager, BranchManager and Assistant correspond to three different functions, namely Manager( ), BranchManager( ) and Assistant( ) as illustrated in Table 4, Table 5 and Table 6. Therefore, after the user inputs content of the directory "bp.", the system knows the function of the directory "bp," which is input after "bp.", i.e. one of Manager ( ), BranchManager( ) and Assistant( ). The system pops up a list including these three functions to the user for selection which avoids the trouble for the user to memorize multiple functions under multiple directories and also reduces possible spelling mistakes of function names. This prompt means is of special advantage where there are a large number of directories and/or large number of relationships under a directory.

Figure 6:
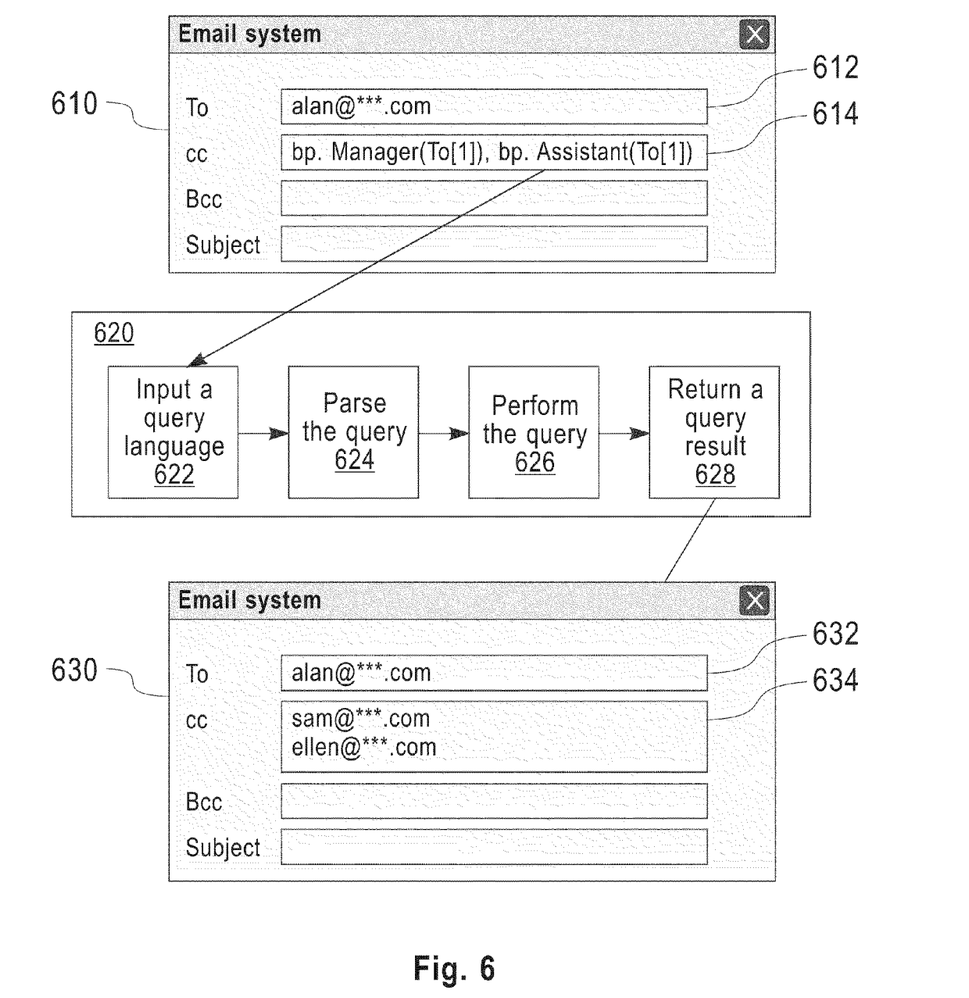
FIG. 6 illustrates a user interface for querying contact information of a plurality of unknown contacts, according to one embodiment.

FIG. 6 illustrates a user interface for querying contact information of a plurality of unknown contacts, according to one embodiment. A user interface 610 and 630 show a comparison view concerning the address input portion in the user interface before and after the invention is used.

In FIG. 6, the email address of contact Alan has been input into a "To" field 612 and a query language into a "CC" field 614. A dashed-line block 620 is a query procedure of the method. In step 622, the query language bp.Manager (To[1]) and bp.Assistant (To[1]), which the user has input, is fed to the query composer 330. In step 624, the query composer 330 parses the received query language and sends the parsed query request to the query processing engine 340. In step 626, the query processing engine 340 invokes the directory query agent 326 for query. Finally, a query result, i.e. information on unknown contacts, is returned to a "CC" field 634 of the user interface 630 of the email system in step 628. In the dashed-line block 620, there appears in "CC" field 634 the query result, i.e. Alan's manager Sam's email address and Alan's assistant Ellen's email address, which is returned based on the query language in "CC" field 614. Through the processing step shown in the dashed-line block 620, there appears in "CC" field 634 the query result, i.e. Alan's manager Sam's email address and Alan's assistant Ellen's email address, which is returned based on the query language in "CC" field 614.

Although the foregoing embodiments has been described in the contact of email communication means, those of ordinary skill in the art will appreciate that the method according to an embodiment of the present invention also applies to other communication means, such as traditional voice telephone, video telephone, cell phone, network telephone, email, instant message, short message service and other different communication means.

The directory plugin 310, the query language designer 320 and the query processing engine 340 location may vary according to various embodiments. The directory plugin 310, the query language designer 320 and the query processing engine 340 can be located at the same server, according to one embodiment. The configurations of directory plugin 310, query language designer 320 and query processing engine 340 as well as the query operation can be implemented on the server side as illustrated in FIG. 3. The directory plugin 310, the query language designer 320 and the query processing engine 340 can also be located on the client side such that the configuration and the query operation are implemented on the client side, according to one embodiment. The directory plugin 310, the query language designer 320 and the query processing engine 340 may be located at a different proxy server (not shown) other than the server, according to one embodiment. Therefore, the configuration and query operation would be implemented at the proxy server. The directory plugin 310, the query language designer 320 and the query processing engine 340 may be located on the server side, on the client side and at a proxy server, respectively, for the configuration and query operation, according to one embodiment.

The method for querying contact information can be closely combined with a commonly used communication tool (e.g. an email system), according to one embodiment. Therefore, the task which was formerly performed by different tools and steps can be completed through one tool, thereby greatly reducing the operation time and complexity. It is understood by those skilled in the art that respective features and steps in the foregoing embodiment and its variations can be combined provided contact information can be queried based on relationship information.

The present invention can be implemented by various means. The present invention can be implemented by programming languages, including, without limitation, C, C++, C#, Java and the like. The present invention can be implemented in hardware or a combination of software and hardware. Those skilled in the art will recognize that the present invention can also be embodied on a computer program product arranged on a storage medium to be used for any proper data processing system. Such storage medium can be a recordable medium used for machine readable information, including a magnetic medium, optical medium or other proper medium. Examples of a recordable medium include a floppy or magnetic disc in a hard disc drive, an optical disc for an optical drive, a magnetic tape, and other medium those skilled in the art can contemplate. Those skilled in the art will further recognize that any communication terminal with proper programming means can perform the steps of the method of the present invention as embodied in a program product for example.

The foregoing description of the embodiments of the invention has been presented only for the purpose of illustration and description and is not intended to be exhaustive or to limit the invention to the precise forms disclosed. As the embodiments of the present invention have been described in the context of an email application as a representative example of various communication means and an email address as a representative example of contact information, it is understood by those skilled in the art that the present invention is not limited to email applications and applies to any other type of communication means. The present invention is not limited to an email address and applies to any other type of contact information, such as instant message identification, cell phone number, traditional voice telephone number, short message address, video telephone identification and the like. Numerous modifications and adaptations are apparent to those skilled in the art without departing from the spirit and scope of the invention.

What is claimed is:

1. A method for querying contact information, the method comprising:
    initialization steps of:
        creating a query directory by extracting relationship information and contact information of a plurality of contacts from at least one network;
        parsing the relationship information and contact information of the plurality of contacts;
        dynamically generating a query language syntax corresponding to said parsed relationship information in the query directory;
        generating a directory query agent corresponding to relationship information; and
        providing the query language syntax for user input of query language; and
    query processing steps of:
        receiving a query language comprising relationship information of a plurality of contacts with unknown contact information;
        generating a query request by parsing the query language according to the query language syntax generated for the query directory;
        receiving the query request at a query processing engine and invoking the directory query agent for identifying the plurality of contacts with unknown contact information and querying contact information of the plurality of contacts with unknown contact information in the query directory to obtain the contact information requested in the query request; and
        returning the contact information of the plurality of contacts requested in the query request.

2. The method of claim 1, wherein the directory comprises contact information and relationship information of a plurality of contacts.

3. The method of claim 1, wherein the contact information of the plurality of contacts with unknown contact information is queried in at least one directory by invoking the directory query agent that corresponds to the relationship information of the plurality of contacts with unknown contact information.

4. The system of claim 1, wherein the relationship information of the plurality of contacts with unknown contact information comprises a plurality of relationships between the plurality of unknown contacts and a plurality of known contacts.

5. The method of claim 1, wherein the contact information is selected from the group consisting of:
    an email address,
    an instant message identification,
    a cell phone number,
    a traditional voice telephone number,
    a short message address, and
    a video telephone identification.

6. The method of claim 1, wherein the network comprises a social community network having the relationship information and the contact information of the plurality of contacts.

7. The method of claim 1, wherein the network comprises a enterprise network having the relationship information and the contact information of the plurality of contacts.

8. The method of claim 1 wherein the initialization steps are performed in response to receipt of query language from a user.

9. The method of claim 1 further comprising prompting a user based on the generated query language syntax.

10. A system for querying contact information, the system comprising:
    a directory plugin for creating a query directory by extracting relationship information and contact information of a plurality of contacts from at least one network;
    a query language designer for parsing the relationship information and contact information of the plurality of contacts, dynamically generating a query language syntax corresponding to said parsed relationship information in the query directory;
    generating a directory query agent corresponding to the relationship information; and
    providing the query language syntax for user input of query language;
    a communications component for receiving a query language having relationship information of a plurality of contacts with unknown contact information;
    a query composer for generating a query request, wherein generating the query request comprises parsing the query language according to the generated query language syntax; and
    a query processing engine for receiving the query request and invoking the directory query agent for identifying the plurality of contacts with unknown contact information and for querying contact information of the plurality of contacts with unknown contact information in the query directory to obtain the contact information of the plurality of contacts with unknown contact information requested in the query request; and for returning the contact information of the plurality of contacts with unknown contact information requested in the query request.

11. The system of claim 10, wherein the directory comprises contact information and relationship information of a plurality of contacts.

12. The system of claim 10, wherein the contact information of the plurality contacts with unknown contact information is queried in at least one directory by invoking the directory query agent that corresponds to the relationship information of the plurality of contacts with unknown contact information.

13. The system of claim 10, wherein the relationship information of the plurality of contacts with unknown contact information comprises a plurality of relationships between the plurality of unknown contacts and a plurality of known contacts.

14. The system of claim 10, wherein the contact information is selected from the group consisting of:
an email address,
an instant message identification,
a cell phone number,
a traditional voice telephone number,
a short message address, and
a video telephone identification.

15. The method of claim 10, wherein the network comprises a social community network comprising the relationship information and the contact information of the plurality of contacts.

16. The method of claim 10, wherein the network comprises a enterprise network comprising the relationship information and the contact information of the plurality of contacts.

17. A computer program product for querying contact information, the computer program product comprising a non-transitory computer readable storage medium to store a computer readable program, which when executed causes a computer to carry out a method comprising the steps of:

initialization steps of:
creating a query directory by extracting relationship information and contact information of a plurality of contacts from at least one network;
parsing the relationship information and contact information of the plurality of contacts;
dynamically generating a query language syntax corresponding to relationship information in the query directory;
generating a directory query agent corresponding to relationship information; and
providing the query language syntax for user input of query language; and
query processing steps of:
receiving a query language comprising relationship information of a plurality of contacts with unknown contact information;
generating a query request by parsing the query language according to the query language syntax generated for the query directory;
receiving the query request at a query processing engine and invoking the directory query agent for identifying the plurality of contacts with unknown contact information and querying contact information of the plurality of contacts with unknown contact information in the query directory to obtain the contact information requested in the query request; and
returning the contact information of the plurality of contacts requested in the query request.

18. The computer program product of claim 17, wherein the operations to be performed by the computer further comprise:
generating a query processing agent; and
linking the directory query agent to the query processing agent.

19. The computer program product of claim 17 wherein the initialization steps are performed in response to receipt of query language from a user.

20. The computer program product of claim 17 further comprising prompting a user based on the generated query language syntax.

* * * * *